Sept. 26, 1950   S. LANDO   2,523,833
MULTIPLE HOOK FISHING TACKLE
Filed April 2, 1947
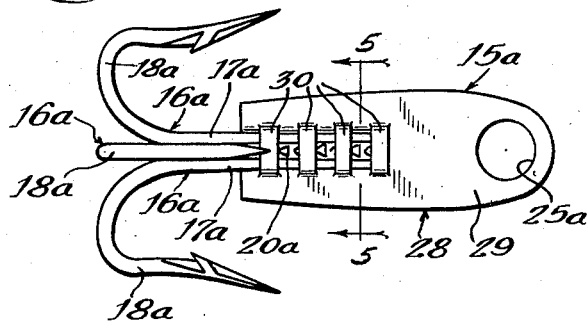
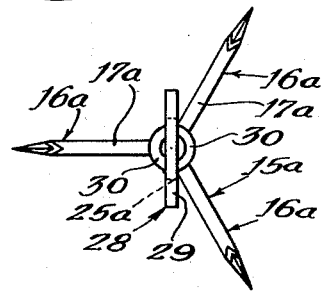
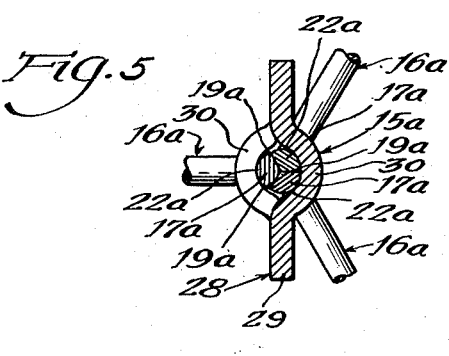
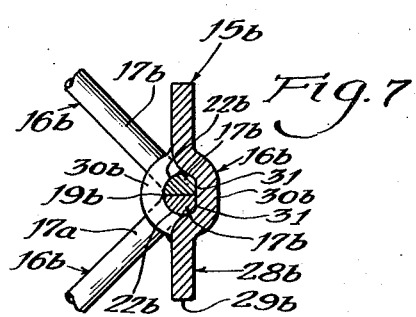
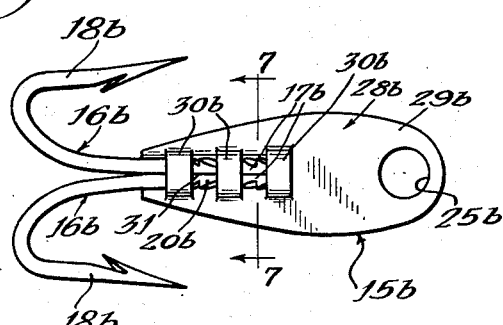
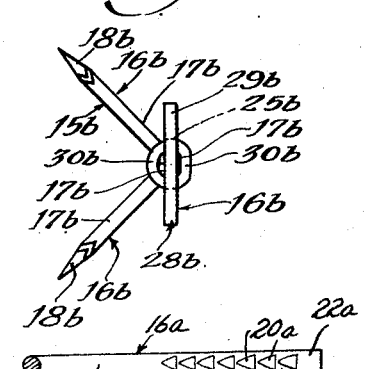
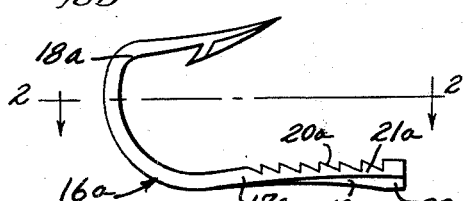
Inventor:
Sebastiano Lando
By: Wallace and Cannon
Attorneys Patented Sept. 26, 1950

2,523,833

UNITED STATES PATENT OFFICE 2,523,833

MULTIPLE HOOK FISHING TACKLE

Sebastiano Lando, Chicago, Ill., assignor to Land-O-Tackle, Inc., Chicago, Ill., a corporation of Illinois Application April 2, 1947, Serial No. 738,836

1 Claim. (Cl. 43—44.83)

This invention relates to multiple hook fishing tackle assembly.

A primary object of the present invention is to provide a multiple hook fishing tackle assembly embodying a novel construction and arrangement for holding the individual hooks of the multiple fish hook assembly in assembled relationship and at preselected angles relative to each other and against accidental displacement or dislodgment therefrom.

Another object of the invention, ancillary to the foregoing object, is to provide a novel method for assembling the various hooks of the new multiple hook fishing tackle assembly and for holding them in assembled relationship in a preselected angular relationship relative to each other and against accidental displacement or dislodgment therefrom.

An additional object of the invention is to provide a novel construction for preventing the individual hooks embodied in the new multiple hook fishing tackle assembly from being withdrawn therefrom when the hooks are subjected to pulling forces in use.

A further object of the invention is to provide a novel method for assembling the hooks which are embodied in the new multiple hook fishing tackle assembly and for deforming a clamping member in position of use thereon so that the hooks will not be withdrawn from proper position in the assembly when subjected to pulling forces in use.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claim.

In the drawings:

Fig. 1 is a side elevational view illustrating one of the individual hooks embodied in the new multiple hook fishing tackle assembly;

Fig. 2 is a view on line 2—2 in Fig. 1, partly in section and partly in top plan;

Fig. 3 is an elevational view of a multiple hook fishing tackle assembly embodying a preferred form of the present invention;

Fig. 4 is an end elevational view of the multiple hook fishing tackle assembly illustrated in Fig. 1 and as seen from the right hand end in Fig. 1;

Fig. 5 is an enlarged transverse sectional view on line 5—5 in Fig. 3 illustrating the means by which and the manner in which the individual hooks in the multiple hook fishing tackle assembly are arranged and held in assembled relationship and in the desired angular relationship relative to each other in the multiple hook fishing tackle assembly illustrated in Figs. 3 and 4;

Fig. 6 is an elevational view illustrating a modification of the invention which embodies only two individual hooks in the multiple hook fishing tackle assembly rather than three individual hooks as in the form of the invention illustrated in Figs. 3, 4 and 5;

Fig. 7 is an enlarged transverse sectional view on line 7—7 in Fig. 6, illustrating the means by which and the manner in which the two individual hooks which are embodied in the fishing tackle assembly illustrated in Fig. 6 are held in assembled relationship and in the desired angular position and relationship relative to each other; and Fig. 8 is an end elevational view of the multiple hook fishing tackle assembly illustrated in Figs. 6 and 7 as seen from the right hand end thereof in Fig. 6.

A preferred embodiment of the new multiple hook fishing tackle or assembly is illustrated in Figs. 3 to 5, inclusive, of the drawings, wherein it is generally indicated at 15a, and comprises a plurality of individual steel or like metal fish hooks 16a each of which embodies an elongated rod-like shank portion 17a and a pointed or piercing barb 18a.

As best shown in Fig. 3 of the drawing, the shank portion 17a of each of the individual hooks 16a in the multiple hook fishing tackle assembly 15a has two flattened surfaces 19a which intersect in such a manner as to form an internal angle of 120° therebetween. The shank portion 17a of each hook 16a also has a rack of teeth 20a formed on the outer and curved or rounded peripheral edge portion 21a thereof, which is that portion of the peripheral edge of the shank portion 17a of each hook 16a which extends between the two intersecting flat surfaces 19a thereof. The shank portion 17a of each hook 16a also has an enlarged outer end portion 28a which is substantially larger in cross section or diameter than the main extent or body of the shank portion 17a of each hook 16a, as shown in Figs. 1 and 2 of the drawing.

The new multiple hook fishing tackle assembly 15a, which is shown in Figs. 3 to 5, inclusive, of the drawing, comprises a metal clamping plate 28, which may be made of any suitable relatively soft metal, such, for example, as brass, copper or the like, and includes a substantially flat body 29 provided with an opening 25a in one end portion thereof for the reception of a fish line, leader, or the like.

The metallic clamping plate 28 has a plurality of spaced clamping ribs 30 formed integral therewith and arranged in spaced relationship to each other, lengthwise or axially of the substantially flat body 29 of the clamping plate or member 28. These clamping ribs 30 are suitably formed from the metal stock of which the body 29 of the clamping plate or member 28 is formed and, as shown in Figs. 4 and 5, each of these clamping ribs 30 is substantially semi-circular in cross sectional form.

In assembling the parts of the new multiple hook fishing tackle assembly which is illustrated in Figs. 3 to 5, inclusive, of the drawing, the shank portions 17a of the three individual hooks 16a are arranged together in a cluster, with their flattened surfaces 19a in contact with each other in the manner illustrated in Fig. 5 of the drawing. Accordingly, since the two flattened surfaces 19a on the shank portion 17a of each hook 16a intersect at an internal angle of 120°, when the shank portions 17a of the three hooks 16a are thus assembled in a cluster the peripheral surfaces of the three hooks 16a, which include the rounded portions 21a on which the racks 20a are formed, occupy 360° of arc or a complete circle. During the operation of assembling the three hooks 16a the shank portions 17a thereof may be held in their thus assembled position in any suitable manner, as by means of any suitable jig or other suitable holding device. The clamping plate or member 28 may then be slipped over the assembled cluster of the elongated rod-like shank portions 17a of the three fish hooks 16a. During this operation the shank portions 17a of the three hooks 16a pass through the arcuate raised clamping ribs 30 which are formed on the body 29 of the clamping plate 28, and between the said raised ribs 30 and the flat body 29 of the clamping member 28. Accordingly, after the clamping member or plate 28 has been placed in proper position the clamping ribs 30 are deformed or pressed inwardly, by means of any suitable forming die or other suitable tool, and while holding the three hooks 16a in properly assembled position in the cluster which they form when assembled. The extent to which the clamping ribs 30 need be deformed or pressed inwardly is relatively slight and when so deformed or pressed inwardly the thus inwardly deformed or pressed clamping ribs 30 engage the teeth 20a which are formed on the elongated rod-like shank portions 17a of the hooks 16a and thus prevent the said elongated rod-like shank portions 17a of the fish hooks 16a from being pulled out of or withdrawn from their proper positions in the assembly 15a when the fish hooks 16a are subjected to pulling forces in use.

Thus it will be noted that any pulling force exerted on the hook 16a merely tends to pull the teeth of the racks 20a against the inwardly deformed or pressed clamping ribs 30 formed in the body of the clamping member or plate 28 and the hooks 16a will thus be prevented from being separated from or pulled out of proper position when the fish hooks 16a are subjected to pulling forces in use.

Such withdrawal of the elongated rod-like shank portions 17a of the fish hooks 16a from the clamping member or plate 28 is also further prevented by the enlarged inner end portion or head 22a which is formed on each of the elongated rod-like shank portions of the three fish hooks 16a. Thus, when the assembly of the three fish hooks 16a has been completed these enlarged inner end portions or heads 22a on the elongated rod-like shank portions 17a of the fish hooks 16a are positioned within the clamping member or plate 28 so that pulling forces exerted on the fish hooks 16a in use merely tend to pull these enlarged inner end portions or heads 22a against the first of the clamping ribs 30 disposed adjacent threeto and which thus prevent withdrawal of the elongated rod-like shank portions 17a of the fish hooks 16a from the clamping member 28 as shown in Figs. 1 to 5, inclusive, of the drawing.

A modification of the invention is illustrated in Figs. 6, 7 and 8, and those parts which are embodied in this form of the invention which are substantially similar to corresponding parts which are embodied in the form of the invention illustrated in Figs. 3 to 5, inclusive, have been given similar reference numerals followed by the additional and distinguishing reference character b.

The form of the invention which is illustrated in Figs. 6, 7 and 8 of the drawing is similar to the form of the invention illustrated in Figs. 3, 4 and 5 of the drawing but differs therefrom primarily in that it embodies only two of the individual hooks 16b and in that each of the elongated rod-like shank portions 17b which is embodied in each of the individual hooks 16b in this form of the invention has a substantially flat surface 19b which forms approximately a diameter of the said elongated rod-like shank portion 17b of each hook 16b. Thus, as shown in Fig. 7, in the multiple hook fishing tackle assembly illustrated in Figs. 6, 7 and 8 of the drawing, there are two of these flat surfaces 19b which are disposed in contact with each other in the completed assembly 15b. In addition, the elongated rod-like shank portion 17b of each hook 16b has a flattened surface 31 on which a row of teeth 20b are formed and each of these flattened surfaces 31 intersects the corresponding substantially flat surface 19b at approximately a right angle, as shown in Fig. 7 of the drawing.

In assembling the parts which are embodied in the form of the new multiple hook fishing tackle assembly 15b which is illustrated in Figs. 6, 7 and 8 of the drawing, the substantially flat surfaces 19b of the elongated rod-like shank portions 17b of the two hooks 16b are arranged in contacting engagement with each other, in the manner shown in Figs. 6, 7 and 8 of the drawing, and the clamping member or plate 28b is then assembled therewith by slipping the raised clamping ribs 30b over the elongated rod-like shank portions 17b and the rows of teeth 20b formed thereon. The clamping ribs 30b may then be deformed or pressed radially inwardly so that their inner surfaces will engage the teeth 20b formed on the elongated rod-like shank portions 17b of the fish hooks 16b and thus prevent withdrawal of the fish hooks 16b from their proper position in the assembly 15b when the fish hooks 16b are subjected to pulling forces in use. Such withdrawal of the fish hooks 16b from their proper positions in the multiple fish hook assembly 15b, and from assembled relationship with the metal clamping member 28b, is further prevented by the enlarged inner end portions or heads formed on the elongated rod-like shank portions 17b of the fish hooks 16b, as may be seen by reference to the form of the invention illustrated in Figs. 1 to 5, inclusive of the drawing.

It will thus be seen from the foregoing description, considered in conjunction with the accompanying drawings, that the present invention provides a novel multiple hook fishing tackle assembly and a novel method of assembling the same, and that the invention thus has the desirable advantages and characteristics and accomplishes its intended objects, including those hereinbefore pointed out and others which are inherent in the invention.

I claim:

A multiple hook fishing tackle assembly comprising a plurality of fish hooks arranged in a cluster and each including a pointed barb and an elongated rod-like shank portion having two flat surfaces extending axially thereof and a portion of a cylindrical surface, the elongated rod-like shank portions of the hooks being arranged side by side in parallel relationship with the flat surfaces of the shanks of the hooks in contacting and mating relationship, whereby the barbed portions of the hooks are spaced circumferentially a predetermined distance from each other and the combined curved portions of all the shanks substantially define a cylindrical surface, each of the elongated rod-like shank portions having a row of teeth formed in its peripheral surface and extending axially thereof, and an elongated flat plate member having intermediate its side edges a series of substantially semi-circular integral spaced portions extending outwardly from each side face of the plate, the series of semi-circular portions at opposite sides of the plate each being of the same size and shape and being disposed in axial alignment, the semi-circular spaced portions at one side of the plate cooperating with the semi-circular spaced portions at the opposite side of the plate to form a plurality of clamping sleeves in which the shank portions of the hooks are disposed with their curved portions in direct contact with the inner surfaces of the adjacent semi-circular portions of the plate, and with the teeth on each of said shank portions in locking engagement with the side edges of a plurality of said semi-circular portions of the clamping sleeves.

SEBASTIANO LANDO.

REFERENCES CITED

The following references are of record in the file of this patent:

UNITED STATES PATENTS

| Number | Name | Date |
|---|---|---|
| 557,037 | Toquet | Mar. 24, 1896 |
| 799,176 | Marble | Sept. 12, 1905 |
| 835,766 | Strehlow | Nov. 13, 1906 |
| 1,156,152 | Krenrick | Oct. 12, 1915 |
| 1,621,082 | Pflueger | Mar. 15, 1927 |
| 1,657,966 | Jordan | Jan. 31, 1928 |
| 2,182,320 | Pearson | Dec. 5, 1939 |